United States Patent [11] 3,626,966

| | | | | |
|---|---|---|---|---|
| [72] | Inventor | Liudas Vanagas Chicago, Ill. | | |
| [21] | Appl. No. | 834,661 | | |
| [22] | Filed | June 19, 1969 | | |
| [45] | Patented | Dec. 14, 1971 | | |
| [73] | Assignee | Powers Regulator Company Skokie, Ill. | | |

[54] STEAM AND WATER MIXER
4 Claims, 11 Drawing Figs.

[52] U.S. Cl............................................. 137/100,
137/604, 137/625.4, 137/630.19, 259/4, 261/59
[51] Int. Cl........................................................ G05d 11/00
[50] Field of Search............................................ 137/100,
604, 625.4; 261/158, 159, 160, 161, 59

[56] References Cited
UNITED STATES PATENTS

| | | | |
|---|---|---|---|
| 1,886,534 | 11/1932 | Dornhofer.................... | 261/159 |
| 3,489,162 | 1/1970 | Meynell........................ | 137/100 |
| 2,470,025 | 5/1949 | Fraser ......................... | 137/100 |
| 2,650,604 | 9/1953 | Barnett........................ | 137/100 |
| 3,087,675 | 4/1963 | Honegger..................... | 137/625.4 X |
| 3,105,519 | 10/1963 | Fraser ......................... | 137/625.4 X |
| 3,135,280 | 6/1964 | Kozel ........................... | 137/100 X |
| 3,192,939 | 7/1965 | Moen ........................... | 137/100 |
| 3,219,325 | 11/1965 | Brown.......................... | 137/625.4 X |
| 3,241,566 | 3/1966 | Roman ......................... | 137/100 |

Primary Examiner—Samuel B. Rothberg
Assistant Examiner—David J. Zobkiw
Attorney—Hume, Clement, Hume & Lee ABSTRACT: A steam and water mixing valve to produce tempered water in which a control valve regulates the movement of steam and water through separate passages in said mixing valve to a common mixing chamber. A deflector element is placed in the steam passage at a point where the steam enters the mixing chamber and contacts the water to ensure a direct and more efficient transfer of heat energy to the water from the steam, thereby resulting in quieter operation of the mixing valve. Also, the inlet to the steam passage is shut off before the outlet of the mixing chamber is. By shutting off in this order, the chances of obtaining live steam from the outlet at the time the mixer is being closed is eliminated.

Inventor
Liudas Vanagas
By Hume, Clement,
Hume & Lee
Attorneys

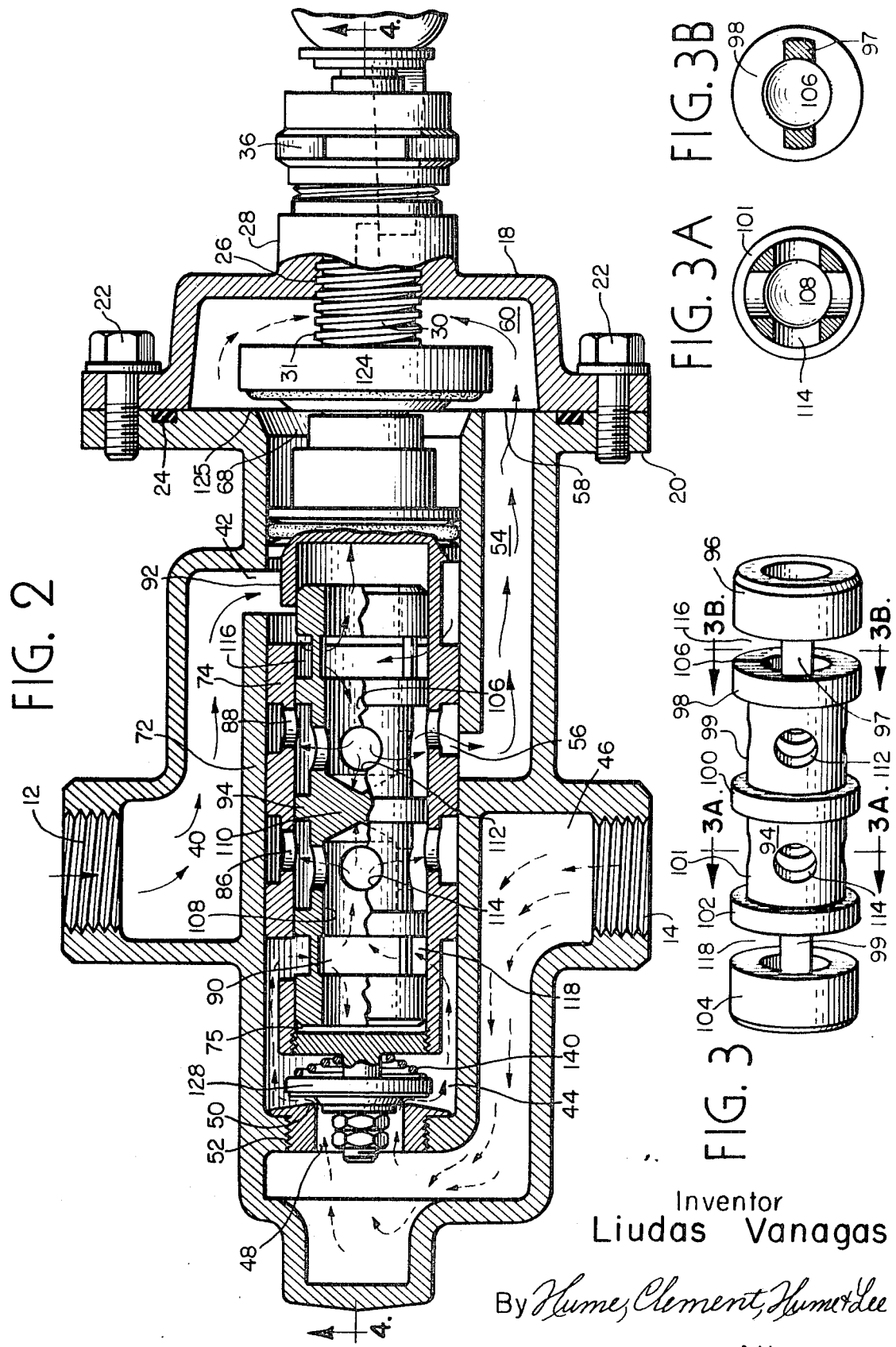

Inventor
Liudas Vanagas
By Hume, Clement, Hume & Lee
Attorneys

STEAM AND WATER MIXER

This invention pertains to an improved valve mechanism and in particular to a mixing valve adapted to receive steam and water from independent sources and to mix the same in varying ratios to produce hot or tempered water. One type of system in which the invention is particularly suited for use consists of a source of steam and a source of unheated liquid, such as water for example, and to mix the same to produce liquid, or water, at some temperature above that at which the liquid entered the valve. The invention provides an efficient, low cost, and durable hot water source for systems where it is not practical to install a steam-heated storage tank and regulator.

In valve systems wherein steam and water are mixed directly in a relatively large mixing chamber, efficient heat transfer is not easily obtained because the steam pressure drastically reduces when it comes into contact with the cold water and the temperature drops. This sudden change in pressure results in the production of a shock force, commonly referred to as "water hammer," causing the valve housing and associated plumbing to vibrate. Besides the disturbing noise, serious damage may result, requiring expensive repairs. Water hammer also causes excessive wear on the valve mechanism, and the effective lifespan of the valve is decreased.

It is an object of the present invention to alleviate this problem by providing a valve which is capable of mixing steam and water thoroughly and efficiently to give quiet operation.

It is a further object of this invention to provide a steam and water mixing valve providing water temperature selection and shutoff from a single control handle.

Another object of the present invention is to provide a pressure-equalizing mechanism which ensures the delivery of tempered water at substantially constant temperatures regardless of variations in pressures of the steam and water in the supply lines.

A further object of this invention is to provide a deflection element in the steam passage at the point where the steam and water first come into direct contact which element deflects the steam directly into the water, thereby avoiding an abrupt energy transfer when heating the water and resulting in a quieter valve operation.

Another object of the present invention is to provide for the closing of the inlet to the steam passage of the valve prior to shutting off the outlet of the mixing chamber, thereby eliminating the chances of obtaining live steam from the outlet at the time the mixer is turned off.

The valve herein described provides ease of maintenance in that all parts are removable from the front of the valve housing. Also, the cartridge containing the two shutoff poppet valve assemblies can be replaced as a module, or the poppets can be replaced individually. The steam inlet valve seat can be replaced, as well as other parts, without special tools. The valve is designed to provide easy assembly on a craftsman's bench, and no alignment is necessary. In the drawings:

FIG. 2 is a longitudinal cross-sectional view taken along the lines 2—2 in FIG. 1;

FIG. 3 is a perspective view of the floating piston which acts as a pressure-equalizing mechanism independently of temperature control;

FIGS. 3A and 3B are cross-sectional views along the lines 3A—3A and 3B—3B, respectively, in FIG. 3;

Figure 1:
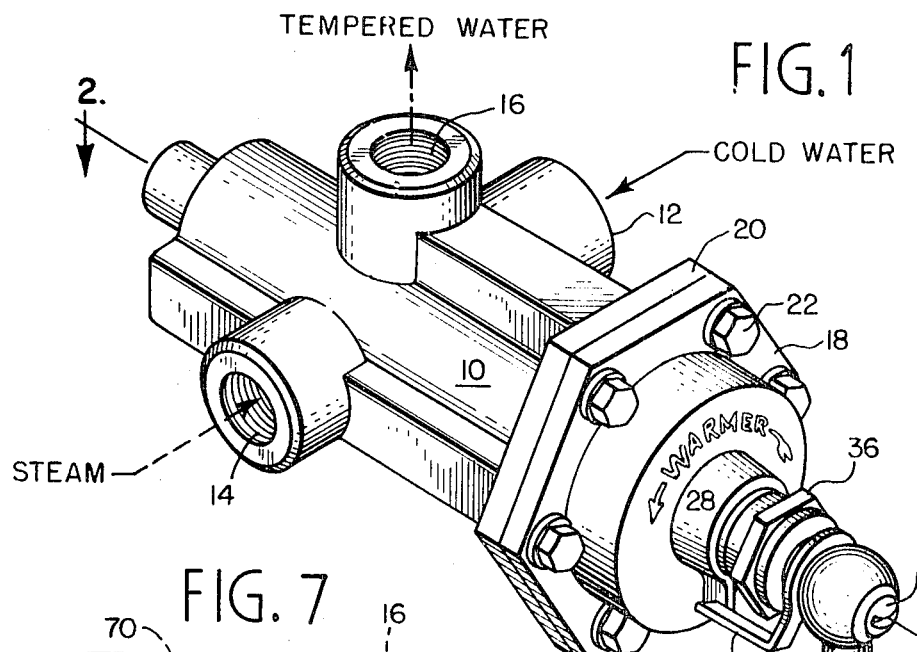
FIG. 1 is a perspective view of the mixing valve.

Referring now to FIG. 1 of the drawings, the mixing valve is comprised of a housing generally denoted by the numeral 10 which has cold water inlet port 12 and steam inlet port 14. These inlet ports are provided with internal threads or other suitable means to facilitate connection to a source of cold water (not shown) and a source of steam (not shown), respectively. The housing 10 also comprises a tempered water outlet port 16 through which the mixer valve supplies hot or tempered water to a suitable using facility (not shown). A cap member 18 is firmly secured to a flange portion 20 of housing 10 by any suitable means such as bolts 22. A seal member, such as a rubber ring 24 (FIG. 2) ensures a fluidtight connection between cap member 18 and housing 10.

Figure 4:
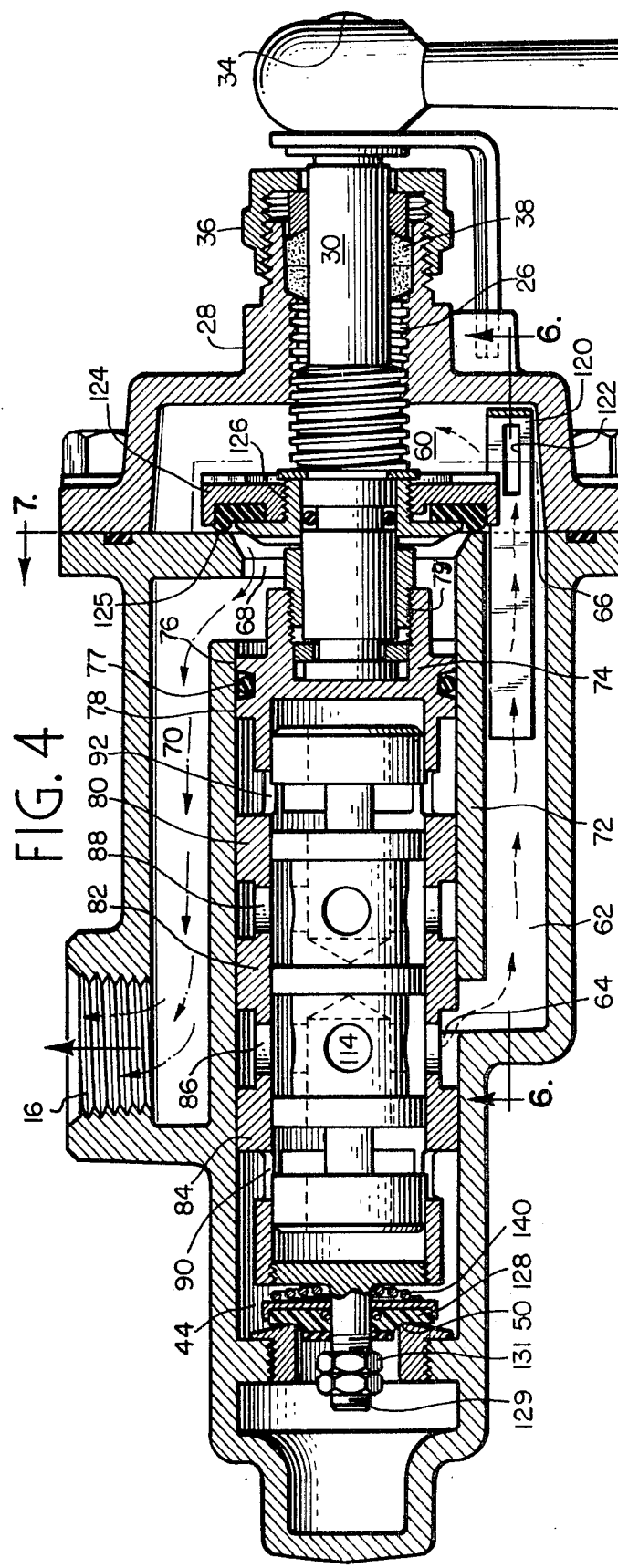
FIG. 4 is a longitudinal cross-sectional view taken along the lines 4—4 in FIG. 2.

As seen best in FIG. 2 and FIG. 4, cap member 18 comprises a raised portion 28 through which threaded hole 26 protrudes. A shaft 30 projects through said hole 26. Threads 31 on a segment of shaft 30 mate with the threads in hole 26 whereby a rotative motion applied to shaft 30 causes said shaft to move axially in housing 10. A handle 32 is connected by means of screw 34 to a portion of shaft 30 which extends outside housing 10. By turning the handle 32, the shaft 30 may be rotated in housing 10 thereby imparting axial movement to shaft 30. A pointer 35 is attached to rotate with shaft 30 to indicate the relative temperature desired.

The raised portion 28 of cap member 18 is externally threaded to receive nut 36 which holds bearing means 38 in place, enabling shaft 30 to rotate on an even axis. (FIG. 4) If bearing means 38 need to be replaced or repacked, nut 36 and screw 34 can be easily removed and bearing means 38 can be replaced or repaired with a minimum of time and effort.

Referring again to FIG. 2, housing 10 comprises a first cold water passage 40 communicating with cold water inlet port 12 at one end, and with port 42 at the other end. Port 42 connects passage 40 to hollow portion 44 in housing 10. A first steam passage 46 is also provided in housing 10 which connects steam inlet 14 to port 48 at the bottom of hollow portion 44. Port 48 comprises valve seat means 50 disposed where port 48 enters hollow portion 44. Valve seat means 50 is provided with a threaded portion 52 to permit ease of replacement of the valve seat if it becomes necessary. A second cold water passage 54 is provided in housing 10 which communicates with port 56 in hollow portion 44 at one end and with port 58 and mixing chamber 60 at the other end. Said mixing chamber 60 is defined by the internal hollow cavity formed between cap member 18 and housing 10.

Figure 7:
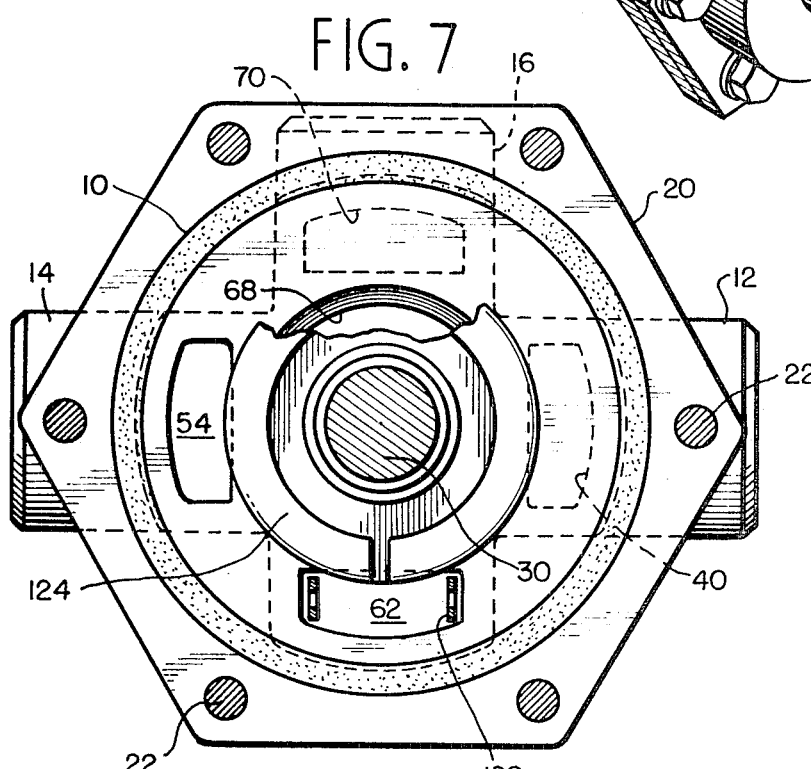
FIG. 7 is a cross-sectional view taken along the lines 7—7 in FIG. 4.

As best seen in FIG. 4, a second steam passage 62 is provided in housing 10, and is located 90° away from cold water passage 54. (FIG. 7) Port 64 communicates with one end of said steam passage 62 and hollow portion 44 of housing 10. The other end of steam passage 62 terminates at port 66 where it communicates with mixing chamber 60. Steam passing from passage 62 mixes with water entering chamber 60 through cold water passage 54 to produce hot or tempered water, as will be more fully discussed.

At the exit of mixing chamber 60 is port 68 (FIG. 4) which communicates with tempered water outlet passage 70. Tempered water is carried from chamber 60, through passage 70 to outlet 16.

The aforesaid passages 40, 54, 62 and 70 are each located 90° distant from each other around the outer periphery of inner wall 72 of housing 10. Housing 10, including inner wall 72, is constructed of a suitable material having relatively high heat transfer capabilities, such as, for example, cast iron. As a result, a substantial quantity of heat energy passes from steam passage 62 through inner wall 72 to the cold water in the hollow portion 44 of housing 10. This transfer of heat energy results in the preheating of the cold water before it enters mixing chamber 60 through passage 54, thus reducing the temperature differential between the steam and water mixing in chamber 60, which in turn assists in alleviating "water hammer."

Figure 8A:
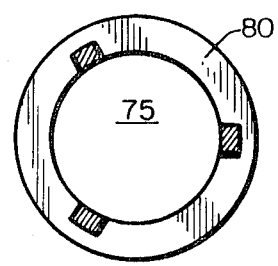
FIG. 8A is a cross-sectional view taken along the lines 8A—8A in FIG. 8.
Figure 8:
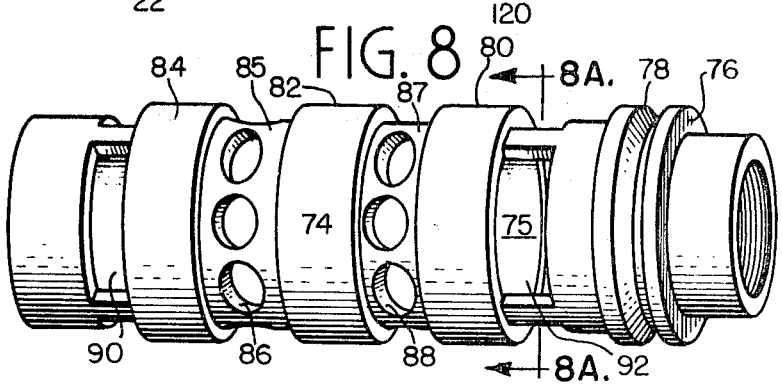
FIG. 8 is a detail view of the moveable sleeve element which controls the relative quantity of steam and water admitted to the mixing chamber.

The inner periphery of wall 72 defines hollow space 44, wherein is located sleeve valve means 74 connected to and forming a part of shaft 30. Sleeve valve means 74, which is shown in detail in FIGS. 8 and 8A, comprises segments 76, 78, 80, 82 and 84 which are of such diameter to permit valve means 74 to fit snugly but movably in hollow portion 44. Sleeve valve means 74 is movable in hollow portion 44 in both an axial and rotative sense, and such movement is controlled by the rotation of shaft 30 and handle 32. A rubber O-ring 77 located between segments 76 and 78 ensures that a fluidtight chamber is defined by sleeve valve means 74 and hollow portion 44.

Sleeve valve means 74 is provided with a hollow core 75 running axially throughout its length. Spool portions 85 and 87 are provided intermediate segments 80, 82 and 84 to provide channels whereby fluid can be conveyed from hollow portion 44 through ports 86 and 88 to hollow core 75. Large open ports 90 and 92 are also provided to establish channels whereby fluid may be conveyed from hollow portion 44 to core 75 of sleeve valve means 74.

As seen in FIG. 4, sleeve valve means 74 comprises a threaded portion 79 which mates with similarly threaded portion of shaft 30. This construction enables sleeve valve means 74 to move with shaft 30, and allows valve means 74 to be easily removed from the valve unit if repair or replacement is required.

Disposed inside hollow core 75 of sleeve valve means 74 is piston 94, shown in detail at FIGS. 3, 3A and 3B. Piston 94 is free to move axially within core 75 and its position varies according to differences between steam and water pressures as will be discussed herein. Piston 94 comprises five segments 96, 98, 100, 102, 104 each having a diameter so that said piston fits snugly but is movable axially within core 75. Intermediate of segments 98, 100 and 102 are smaller diametered spool portions 99 and 101.

The inner core of piston 94 defines two axial chambers 106 and 108 separated by wall 110. When fluids at differing pressures occupy chambers 106 and 108, piston 74 will move axially within the core 75 of sleeve valve 74 in response to such pressure differential, as will be discussed. Segments 96 and 104 are attached to the main body of piston 94 by a set of lugs 97 and 99 respectively. Spaces 116 and 118 formed as a result of the distance between segments 96 and 98, and 102 and 104 provide channels wherein fluid may enter chambers 106 and 108 from core 75. Ports 112 and 114 are located on spool portions 99 and 101 of piston 94 to provide access means for fluids passing from chambers 106 and 108.

A U-shaped deflection element 120 is located in second steam passage 62 and extends into mixing chamber 60. (FIGS. 4 and 6) Rectangular holes 122 are disposed on either longitudinal side of deflection element 120 at points located in said mixing chamber 60. Steam entering mixing chamber 60 through port 66 is deflected through holes 122 in element 120 into direct contact with the water conveyed by passage 54 into chamber 60. Deflection element 120 functions to disturb and break up the steam flow entering mixing chamber 60 from passage 62, which enhances direct contact between the water and the steam in mixing chamber 60, thereby avoiding the abrupt energy transfer which causes "water hammer." Deflector element 120 may be made of any rust-resistant material, such as stainless steel for example.

As shown in FIGS. 2 and 4, poppet valve assembly 124 is directly connected to shaft 30 and operates to open or close port 68 leading from mixing chamber 60 to tempered water passage 70. Poppet valve assembly 124 is secured to shaft 30 by means of screw threads 126, to permit easy removal in case repairs are warranted. When in its closed position, poppet valve assembly 124 rests on valve seat 125, forming a fluidtight seal and preventing fluid from escaping from mixing chamber 60.

At the lower end of shaft 30 and sleeve valve 74, steam poppet valve assembly 128 is retained on threaded portion 129 of shaft 30 by lock nuts 131. Spring 140 exerts a force on poppet valve assembly 128 which enhances its sealing capabilities when closed. Poppet valve assembly 128 opens and closes steam inlet port 48. In its closed position, poppet valve assembly 128 rests on seat 50 and does not permit steam to enter the hollow portion 44 of housing 10. Valve seat 50 is removably affixed to housing 10 by means of screw threads 52 to facilitate easy removal if repair or replacement is warranted.

To operate the disclosed valve, handle 32 is manually turned so that pointer 35 indicates the desired water temperature. Screw threads 31 on shaft 30 mate with the threads in hole 26 in cap member 18, causing shaft 30 and sleeve valve means 74 to move axially in said housing 10. As shaft 30 moves, poppet valve assembly 128 moves off of seat 50, thereby allowing steam from inlet port 14 to pass through steam passage 46 and port 48 into hollow portion 44 of housing 10 (FIG. 2). Steam then passes from hollow portion 44 through port 90 in sleeve valve means 74 and into chamber 108 of piston 94 through channel 118. Steam in chamber 108 then passes from port 114 in piston 94 through port 64 and into second steam passage 62. The amount of steam passing into passage 62 depends on the relative axial positions of sleeve valve means 74 and piston 94. Sleeve valve means 74 is manually positionable, while the location of piston 94 is a function of the steam and water pressure differential in chambers 106 and 108.

Cold water enters inlet port 12, passes into passage 40 and through port 42 into the hollow portion 44 of housing 10. The water next passes through channel 116 in piston 94 to chamber 106, from where it exits through port 112 and is conveyed through port 56 to second cold water passage 54 and into mixing chamber 60.

The water pressure and steam pressure acting in chambers 106 and 108 respectively each exert a force on wall 110 forming the central end of said chambers, thereby positioning piston 94 in hollow sleeve valve means 74 in proportion to the steam and water pressure differential. As piston 94 moves axially in sleeve valve means 74, the various positions of the inlet and outlet ports for both steam and water are regulated so as to provide equal pressures of water and steam arriving in mixing chamber 60. Movement of the handle 34 will change the axial position of sleeve valve means 74 and alter the relative positions of the inlet and outlet ports therein to manually regulate the proportions of steam and water permitted to pass through the valve. This gives the operator control over the temperature of the water desired to be delivered from the valve while insuring that no pressure differential in the steam and water lines will cause bursts of extremely hot or extremely cold water in mixing chamber 60.

Figure 6:
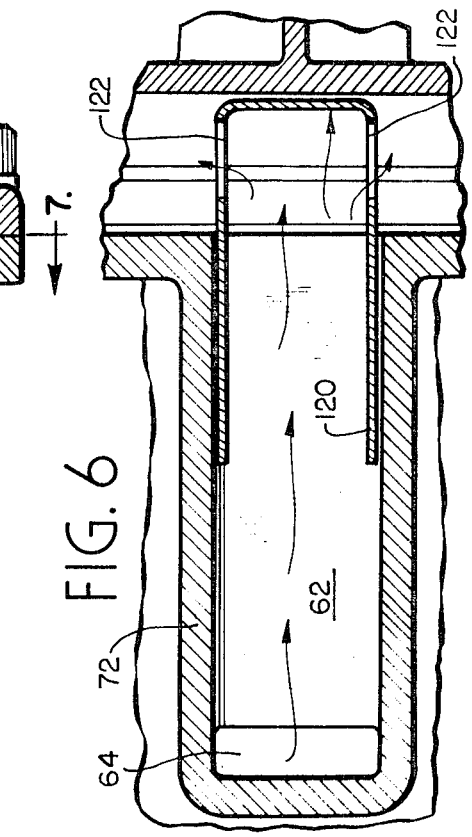
FIG. 6 is a view taken along the lines 6—6 in FIG. 4, illustrating the location of the steam deflection device at the point in the mixing chamber where the steam and cold water come into initial contact.
Figure 5:
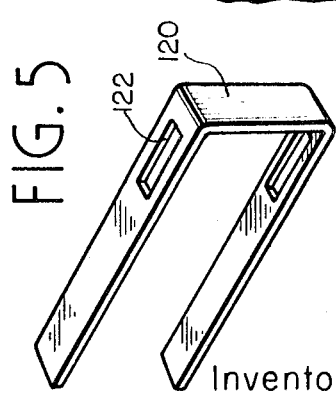
FIG. 5 is a detail view of the steam deflection device which forms a part of my invention.

As seen in FIGS. 4 and 6, U-shaped deflection element 120 is located at the exit of steam passage 62 and extends into mixing chamber 60. The purpose of this deflection element 120 is to divert the steam entering mixing chamber 60 through rectangular holes 122, thereby causing direct contact between the steam and the water entering mixing chamber 60 through passages 62 and 54. This direct mixing of steam and water avoids any abrupt energy transfer when heating the water and results in quieter valve operation and elimination of the well-known "water hammer" effect.

As handle 32 is turned counterclockwise and shaft 30 moves axially in housing 10, poppet valve assembly 124 lifts from its seat 125 to permit cold water to pass through port 68, into tempered water passage 70 and through outlet port 16. As handle 32 is turned further in the same direction, poppet valve assembly 128 moves off seat 50, thereby allowing steam from inlet port 14 to port 48 into hollow portion 44 of housing 10 and into mixing chamber 60.

When closing off the valve system, handle 32 is turned to its off position which moves shaft 30 in an opposite axial direction. Poppet valve assembly 128 returns to contact seat 50, thereby stopping the flow of steam through the valve itself.

The relative positioning of poppet valve assemblies 124 and 128 on shaft 30 causes valve 128 to close steam inlet port 48 at a time prior to the closing of port 68 by valve 124. Spring means 140 keeps valve assembly 128 in contact with valve seat 50 while shaft 30 continues to move laterally upon closing and until valve assembly 124 closes off port 68. By closing the steam inlet port 48 first through this sequence of valve assembly operations, the chances of live steam emanating from outlet port 16 are eliminated.

Having thus described the invention, what is claimed is:

1. In a valve for intermixing water and gaseous steam to produce tempered water and adapted to be connected to a source of water and a source of gaseous steam comprising a housing having:
 a first inlet for connecting to a source of gaseous steam;
 a second inlet for connecting to a source of water;
 an outlet;
 a mixing chamber in said housing in communication with said outlet for mixing said water and gaseous steam and delivering tempered water to said outlet;
 separate passage means for conveying said water and gaseous steam from said first and second inlets to said mixing chamber;
 control means communicating with said separate passage means to selectively regulate the relative amounts of gaseous steam and water delivered to said mixing chamber;
 wherein the improvement comprises:
  a U-shaped deflection element in said gaseous steam passage means to deflect said gaseous steam into direct contact with said water in said mixing chamber.

2. In a valve for intermixing water and gaseous steam to produce tempered water and adapted to be connected to a source of water and a source of gaseous steam comprising a housing having:
 a first inlet for connecting to a source of gaseous steam;
 a second inlet for connecting to a source of water;
 an outlet;
 a mixing chamber in said housing in communication with said outlet for mixing said water and gaseous steam and delivering tempered water to said outlet;
 separate passage means for conveying said water and gaseous steam from said first and second inlets to said mixing chamber;
 control means communicating with said separate passage means to selectively regulate the relative amounts of gaseous steam and water delivered to said mixing chamber;
 wherein the improvement comprises:
  a U-shaped deflection element in said gaseous steam passage means and extending into said mixing chamber to deflect said gaseous steam into direct contact with said water in said mixing chamber.

3. In a valve for intermixing water and gaseous steam to produce tempered water and adapted to be connected to a source of water and a source of gaseous steam comprising a housing having:
 a first inlet for connecting to a source of gaseous steam;
 a second inlet for connecting to a source of water;
 an outlet;
 a mixing chamber in said housing in communication with said outlet for mixing said water and gaseous steam and delivering tempered water to said outlet;
 first passage means communicating between said first inlet and said mixing chamber for conveying gaseous steam to said mixing chamber;
 second passage means communicating between said second inlet and said mixing chamber for conveying water to said mixing chamber;
 control means communicating with said separate passage means to selectively regulate the relative amounts of gaseous steam and water delivered to said mixing chamber;
 wherein the improvement comprises:
  a U-shaped deflection element in said first passage means and extending into said mixing chamber whereby gaseous steam entering said mixing chamber is deflected into direct contact with the water entering said mixing chamber.

4. In a valve for intermixing water and gaseous steam to produce tempered water and adapted to be connected to a source of water and a source of gaseous steam comprising a housing having:
 a first inlet for connecting to a source of gaseous steam;
 a second inlet for connecting to a source of water;
 an outlet;
 a mixing chamber in said housing in communication with said outlet for mixing said water and gaseous steam and delivering tempered water to said outlet;
 first passage means communicating between said first inlet and said mixing chamber for conveying gaseous steam at a certain pressure to said mixing chamber;
 second passage means communicating between said second inlet and said mixing chamber for conveying water at a certain pressure to said mixing chamber;
 pressure valve means in said first and second passage means responsive to gaseous steam pressure in said first passage means and water pressure in said second passage means to insure that said gaseous steam and water pressures are substantially equal when they reach said mixing chamber;
 control means communicating with said separate passage means to selectively regulate the relative amounts of gaseous steam and water delivered to said mixing chamber;
 wherein the improvement comprises:
  a U-shaped deflection element in said first passage means and extending into said mixing chamber whereby gaseous steam entering said mixing chamber is deflected into direct contact with the water entering said mixing chamber.

* * * * *